US011369887B2

(12) United States Patent
Zeidman

(10) Patent No.: US 11,369,887 B2
(45) Date of Patent: Jun. 28, 2022

(54) METHOD AND APPARATUS FOR REMOTE GAME PLAY WITH REAL-TIME COMMENTARY

(71) Applicant: Robert M. Zeidman, Las Vegas, NV (US)

(72) Inventor: Robert M. Zeidman, Las Vegas, NV (US)

(73) Assignee: Good Beat Games, Inc., Las Vegas, NV (US)

( * ) Notice: Subject to any disclaimer, the term of this patent is extended or adjusted under 35 U.S.C. 154(b) by 0 days.

(21) Appl. No.: 16/883,643

(22) Filed: May 26, 2020

(65) Prior Publication Data

US 2021/0370187 A1 Dec. 2, 2021

(51) Int. Cl.
| | |
|---|---|
| A63F 13/86 | (2014.01) |
| G07F 17/32 | (2006.01) |
| H04N 21/454 | (2011.01) |
| A63F 13/87 | (2014.01) |
| H04N 21/2365 | (2011.01) |
| A63F 13/35 | (2014.01) |

(52) U.S. Cl.
CPC ............ *A63F 13/87* (2014.09); *A63F 13/35* (2014.09); *A63F 13/86* (2014.09); *H04N 21/2365* (2013.01); *H04N 21/4542* (2013.01); *A63F 2300/537* (2013.01); *A63F 2300/577* (2013.01)

(58) Field of Classification Search
None
See application file for complete search history.

(56) References Cited

U.S. PATENT DOCUMENTS

| | | | |
|---|---|---|---|
| 4,467,424 A | 8/1984 | Hedges | |
| 6,508,709 B1 | 1/2003 | Karmarkar | |
| 6,511,068 B1 | 1/2003 | Sklansky | |
| 6,679,777 B2 | 1/2004 | Pfeiffer | |
| 6,695,695 B2 | 2/2004 | Angel | |
| 7,477,282 B2 | 1/2009 | Firestone | |
| 7,736,221 B2 | 6/2010 | Black | |
| 8,136,133 B2 | 3/2012 | Walker | |
| 8,838,696 B2 | 9/2014 | Tiwari | |
| 10,086,291 B1* | 10/2018 | Wisler | .................... A63F 13/75 |
| 10,390,064 B2 | 8/2019 | Dury | |
| 2008/0015030 A1* | 1/2008 | Baazov | .................. G07F 17/32 463/42 |
| 2008/0242416 A1* | 10/2008 | Moshal | ............... G07F 17/3276 463/40 |
| 2009/0097757 A1* | 4/2009 | Wimsatt | .................. G06T 13/00 382/190 |
| 2017/0026427 A1* | 1/2017 | Vuong | .................... H04L 51/32 |
| 2017/0289599 A1 | 10/2017 | Bai | |

FOREIGN PATENT DOCUMENTS

WO WO2017166499 10/2017

* cited by examiner

*Primary Examiner* — Damon J Pierce
(74) *Attorney, Agent, or Firm* — Inventive Law Inc.; Jim H. Salter

(57) ABSTRACT

This invention allows the players of multiplayer games like poker, chess, backgammon, go, board games, and video games to play the game online while commenting on the game and explaining their strategies to an online audience without sharing that information with their opponents.

17 Claims, 12 Drawing Sheets

METHOD AND APPARATUS FOR REMOTE GAME PLAY WITH REAL-TIME COMMENTARY

TECHNICAL FIELD

Embodiments of the present invention relate to a technical solution for enabling private and public communications among a group of individuals in different roles while playing an online game. The present invention allows the players to comment on the game and explain their strategies to a remote audience without sharing that information with their opponents.

BACKGROUND

Broadcasts of poker tournaments have become very popular since ways were devised to show each player's hidden "in-the-hole" cards to the camera while not allowing the competing players to see them and thus get an unfair advantage. The first method for exposing the cards to the audience involved glass plates in the tables in front of each player. Each player was required to slide their cards over the plate, to be seen by the camera below and broadcast to a television audience. Later technology involved cameras built into the sides of the poker tables. When the poker player lifted the cards to see them, the cards were broadcast to a television audience by the camera in the table. Modern technology has radio-frequency identification (RFID) transmitting circuitry built-into the playing cards and RFID detectors in the table. Each card's RFID circuit transmits the card number and suit to the RFID receiver in the table. This information is transmitted to a computer that compiles the information from all of the players and allows that information to be superimposed on the broadcast screen of the game.

If the card information were to be seen by another player, or seen by a player's accomplice and transmitted to a player, it would give that player an unfair advantage, so the broadcasts of the games are delayed by minutes. They can also be recorded and delayed by much longer times such as days or months.

One of the exciting features of televised poker games is the commentary by the announcers. These announcers are veteran poker players themselves, and they surmise why each play was made, its probability of succeeding, and what the player was most likely thinking when making a move. To become a better player, and to understand the game better and thus enjoy the game more, the audience members would prefer to hear from the players themselves to describe what the player was thinking at the moment of each play and to learn strategies directly from the players. However, speaking at the table would reveal the player's strategy to their opponents during the game, which would surely lead to their defeat. The games could be recorded and played back with the players reviewing the hands and providing after-the-fact commentary, but with hundreds of hands played in each hour, it would be difficult for the players to recall their thinking for each hand. Plus, this post-game commentary would require players and broadcasters to more than double the amount of time they spent on each game, significantly increasing the costs of broadcasting the games.

To optimize the game viewing experience, there needs to be a means to hear the thoughts of the players themselves in real time, in a way that does not change the game by revealing competitive information to their opponents. The method for doing this should apply equally well to poker, chess, backgammon, go, board games, video games, and all multiplayer games.

A simple solution would be to put poker players in separate recording booths while they play, without visual access to each other, but this solution has a problem. A solution is needed that also enables the poker players to see each other at the game table because in poker in particular, viewing the other players gives clues about their state of mind and is critical to determining strategy. Some players watch other players' speech patterns, hand motions, facial tics, and even the pulsing of blood through veins on their neck. Plus, poker is a social game with banter and "smack talk" that enlivens the game not only for the players but for the audience.

BRIEF DESCRIPTION OF THE DRAWINGS

The present invention is illustrated by way of example, and not by way of limitation, in the figures of the accompanying drawings and in which.

DETAILED DESCRIPTION

Figure 1:
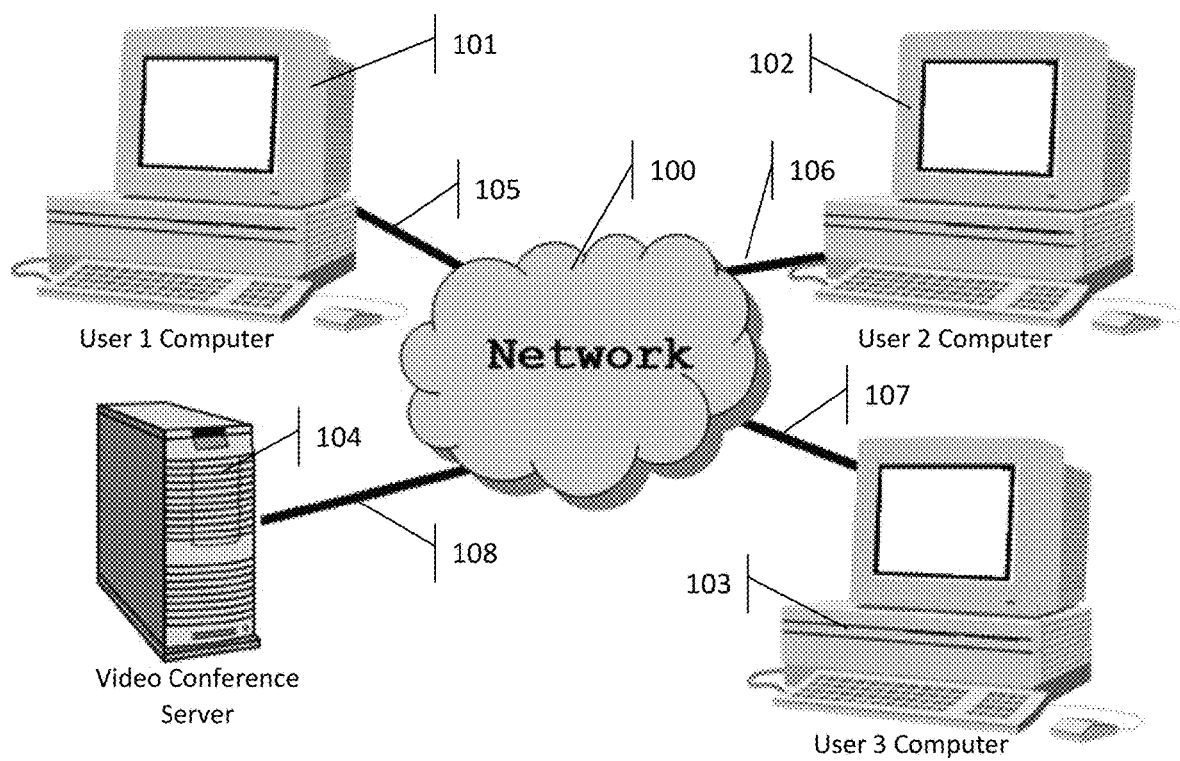
FIG. 1 shows a typical prior art video conferencing system that allows game players to see game play and to communicate with each other in real time.

Embodiments of the invention are directed to a method and system for private and public communications among a group of individuals in different roles while playing an online game. Embodiments of the invention make use of a basic knowledge of video conferencing, electronic communication, and computer programming.

Some portions of the detailed descriptions that follow are presented in terms of processes and symbolic representations of operations on data bits within a computer memory. These descriptions and representations are the means used by those skilled in the data processing arts to most effectively convey the substance of their work to others skilled in the art. A process is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "communicating," "transmitting," "receiving," "executing," "passing," "determining," "generating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, floppy diskettes, optical disks, compact disc read-only memories (CD-ROMs), magneto-optical disks, optical disks, semiconductor read-only memories (ROMs), semiconductor random access memories (RAM), programmable read-only memories (PROM), erasable programmable read-only memories (EPROM), electrically erasable programmable read-only memories (EEPROM), magnetic cards, optical cards, flash memories, or the like.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention describes a system and method that allow poker players to be in separate locations while they play, but enables the poker players to see each other at the game table while talking to each other and giving audio commentary on the game in real time that can be heard by observers but not by other players. There is a control that allows each player to select whether to give audio commentary to the observers or to both the observers and players. The player must not have the option to comment only to other players, because this could result in unethical collusion. There is also a game master that controls overall access to audio and video and can mute or hide various players or observers if they are found to be violating game rules or other constraints.

FIG. 1 is a diagram of a prior art video conferencing system in the exemplary form of the Network 100 that connects User 1 Computer 101 with User 2 Computer 102 and User 3 Computer 103 to Video Conference Server 104 via connections 105, 106, 107, and 108 respectively. Network 100 can be the Internet, a company Intranet, or any other kind of computer network. Connections 105, 106, 107, and 108 can be wired connections such as Ethernet over category 5 (Cat5) cables or wireless connection such as Wi-Fi or other wired or wireless connections or combinations thereof. Video, audio, pictures, documents, control information, and other information are transmitted from video conferencing client software running on User 1 Computer 101 via the Network 100 to video conferencing server software running on Video Conference Server 104. The information is processed and relayed to video conference client software running on User 2 Computer 102 and User 3 Computer 103 where the information is displayed. Similarly, video, audio, pictures, documents, control information, and other information are transmitted from video conferencing client software running on User 2 Computer 102 via the Network 100 to video server software running on Video Conference Server 104 where the information is processed and relayed to video conference client software running on User 1 Computer 101 and to video conference client software running on User 3 Computer 103 where it is displayed on both computers. The system can consist of a minimum of two user computers and no maximum number of user computers except where the system is constrained by the bandwidth of Network 100, memory size or processing power of Video Conference Server 104, or other technical constraints that would be known to one of ordinary skill in the art.

The present invention is a specialized video conferencing system for game players, where users can be categorized as players, observers, and masters, each with different functionality. The present invention comprises four different applications: Client Observer App, Client Player App, Client Master App, and Game Server App. The Client Observer App is used by people observing the game but not playing the game. The Client Player App is used by people playing the game. The Client Master App is used by people supervising the game. The Game Server App is run on a network server to control communication among all the running client apps.

Figure 2:
FIG. 2 shows the client display on a computer monitor of a typical prior art video conferencing system that allows game players to see game play and to communicate with each other in real time.

FIG. 2 shows a prior art Video Conference Client App for allowing real-time communication between participants. The software application runs on Client Computer 200. The Video Conference Client Application Display 201 incorporates a view of the participants. One such view of a participant is labeled Participant 202. Video Conference Client Application Display 201 can be arranged in different manners to show all participants, only the participant who is currently speaking, or some subset of participants as determined by internal settings of the software combined with user settings determined by each individual user of the video conference client software. At the bottom of the Video Conference Client Application Display 201, there are a set of Video Conference User Controls 203 that include an audio mute button and a video display button. The audio mute button allows the Video Conference Client App user to allow the audio from the user's local microphone to be heard by all participants in the video conference or to mute themselves to all participants. The video display button allows the Video Conference Client App user to allow the video from the user's local video camera to be seen by all participants in the video conference or to block transmission of the video to all other participants (i.e., "hide" the user). Typically, there is also a single conference master user who can use their own Video Conference Client Master App to force the muting of audio from any other particular user or group of users to the entire group or to hide any particular user or group of users to the entire group.

As an exemplary description in this patent, the game of Texas Hold'Em poker is used for illustration purposes only. Other variations of poker as well as other multiplayer games such as chess, checkers, backgammon, or video games are also applicable. One of ordinary skill in the art would know that the differences in these games would be insubstantial with respect to how the present invention is implemented.

A basic, and simplified description of the game of Texas Hold'Em is as follows. The dealer deals each player two "hole cards" face down, which the player views but keeps hidden from the other players. After a round of betting, the dealer then deals three "common cards" face up on the table for all players to see. These first three cards are called the "flop." There is a second round of betting, after which the dealer deals another common card face up on the table. This card is called the "turn." After another round of betting, the dealer deals a final common card face up on the table. This card is called the "river." There is then one last round of betting for the hand. During a round of betting, a player may "fold," which means exits from the hand and release their cards, or the player may "check," which means does not bet, "call," which means match the amount of the bet of the previous player, or the player may "raise," which means increase the amount of the bet. At the end of all betting, the players who are still in the hand reveal their hole cards. The winning player is the one with the best poker hand consisting of any combination of 5 cards from among 7 cards consisting of their hole cards and the common cards.

Figure 3:
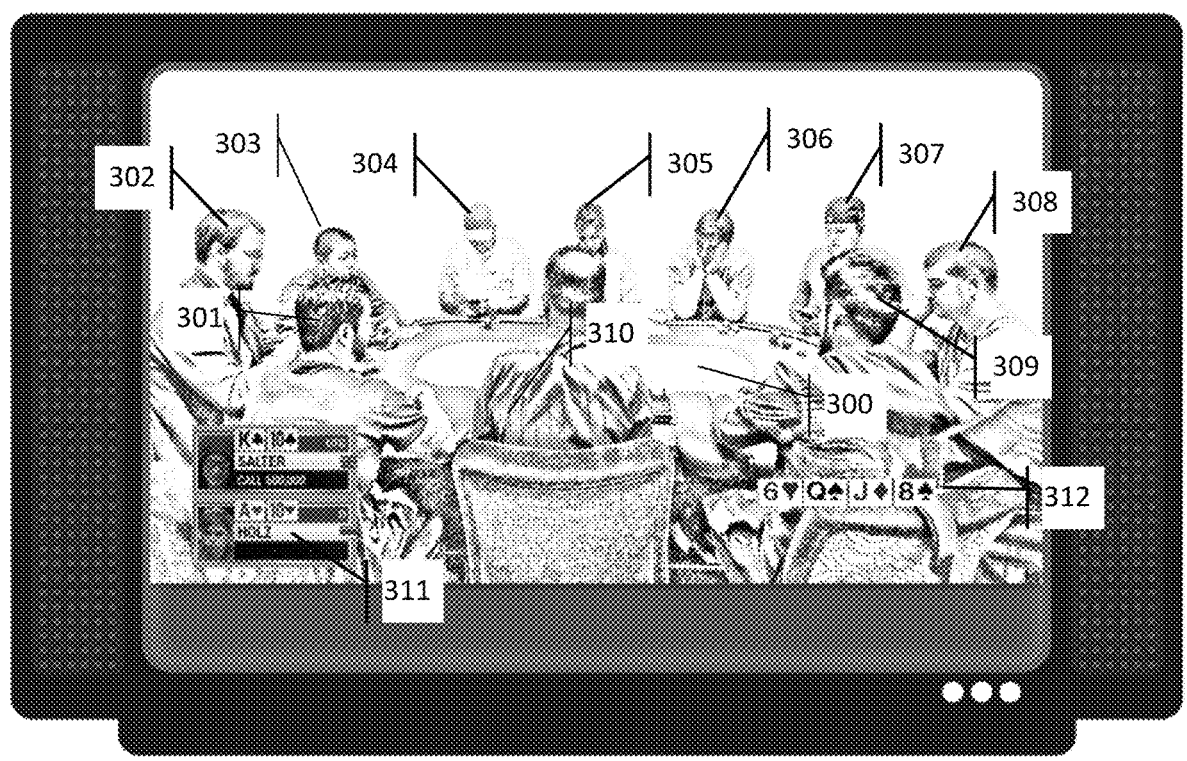
FIG. 3 shows a picture of a prior art television or Internet broadcast of a live action poker game.

FIG. 3 shows a picture of a prior art television or Internet broadcast of a live action Texas Hold'Em poker game. Poker Players 301 through 309 sit around the Poker Table 300. The Dealer 310 deals the cards. In one embodiment, a camera is embedded in the rail of Poker Table 300 in front of each player to record the player's cards. In another embodiment, a glass plate is embedded in the table in front of each player with a camera beneath it so that when the player rests their cards on the plate, the camera records the cards through the glass plate. In yet a third embodiment, there is an RFID receiver for each player that senses the RFID chip embedded in the player's cards to identify the cards. The cards of the players still in the game at any point, until the player has folded their hand, are displayed on the left side of the screen in Player Card Display 311. The common cards that have been placed on the table are displayed on the right side of the screen in Table Card Display 312.

Figure 4:
FIG. 4 shows one embodiment of an observer display for the present invention.

FIG. 4 shows one embodiment of an Observer Display 400 for the present invention, which shows each player, with a particular example labeled Player 401, and each player's hole cards, with a particular example labeled Player Hole Cards 402, the Common Cards 403 on the table, and Observer Controls 404. The Observer Controls 404 allow an observer to select one particular player to listen to. The Observer Controls 404 also allow an observer to listen to a commentator for the game who is not playing the game. The observer can switch between all available audio sources, consisting of all players and all other commentators.

The Master Display looks exactly like Observer Display 400 except there are additional controls (not explicitly shown) to mute any player's audio from reaching other players and observers, hide any player's video from reaching other players and observers, and to take any player out of the game, by disabling that player's client app, for violation of conditions of the game or other reasons.

Figure 5:
FIG. 5 shows one embodiment of a player display for the present invention.

FIG. 5 shows one embodiment of a Player Display 500 for the present invention. Like the Observer Display 400, the Player Display 500 shows each player, with an example labeled Player 401, and the Common Cards 403 on the table. The Player Display 500 also shows the Associated Player 501 and only shows Associated Player Hole Cards 503 for the particular player who is using the display, but does not show hole cards for any other players because that would take all of the skill out the game by displaying each players hidden cards to the other players. Also, there is a mouth veil bar on the video of each player that covers the players mouth, with an example labeled Mouth Veil Bar 504, so that each player can observe the other players and look for "tells," but the other players lips cannot be read while they comment on the game. The player can adjust their own mouth bar on the screen, using the Player Controls 502, so that the player can assume a personally comfortable position and adjust the bar over their mouth. The players have incentive for adjusting the bar correctly so as not to give away their comments about the play to the other players, thus being at a disadvantage.

One of ordinary skill in the art would know that alternatives for Mouth Veil Bar 504 are possible. One such alternative embodiment is to include video processing software in the Player Client App that includes a detector for detecting the player's mouth and a masker for covering the player's mouth or blurring the player's mouth on the video display of each other player. Another alternative embodiment is to have the players wear masks over their mouths, inserting a microphone, if necessary, to capture their audio comments. Many poker players in live games already cover their mouths with bandannas, sweatshirt collars, or stretchy sleeves, so this would not be seen as an unreasonable burden.

The Player Controls 502 allow a player to mute their own comments to the observers if necessary, for example to cover a cough or sneeze, though players would be encouraged to comment often throughout the game. The Player Controls 502 allow a player to communicate to the observers or to both the observers and the other players in the game. For fairness, and to avoid collusion, players do not have an option to communicate directly to other players without also communicating to the observers. Player Controls 502 also allow a player to draw and write on the screen in order to illustrate concepts to the observers. The drawing and writing would be seen by observers but not by other players.

Figure 6:
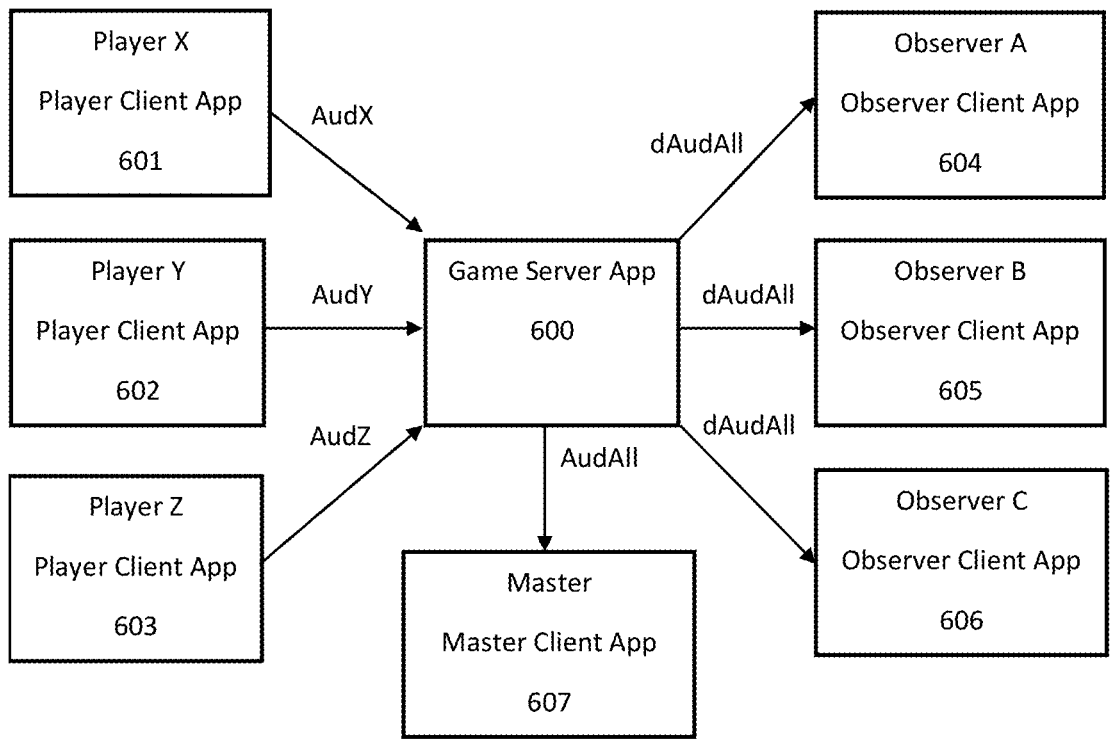
FIG. 6 is a diagram for one embodiment of media communication of the present invention between players, observers, and a master during normal operation.

FIG. 6 is a diagram of audio communication between players, observers, and master in one embodiment during normal operation. Player Client App for Player X 601, Player Client App for Player Y 602, and Player Client App for Player Z 603 all transmit audio signals to Game Server App 600, represented by labels AudX, AudY, and AudZ respectively. Game Server App 600 combines AudX, AudY, and AudZ into a signal labeled AudAll. Without any delay, Game Server App 600 transmits audio signal AudAll, to Master Client App for Master 607. This allows Master to determine if any audio is inappropriate and if so, mute any player, hide any player, or remove any player from the game. Master also monitors video without delay, not explicitly shown here, to determine if any video is inappropriate and if so, to mute any player, hide any player, or remove any player from the game.

After a predetermined delay time, Game Server App 600 transmits delayed audio signal AudAll, labelled dAudAll, from all players to Observer Client App for Observer A 604, Observer Client App for Observer B 605, and Observer Client App for Observer C 606.

Observer Client App for Observer A 604 then transmits only the particular audio signal to the speaker that the observer has selected, AudX, AudY, or AudZ. All audio is transmitted to all observers so that an observer can switch from one player's audio to another without interruption or delay. All player video is transmitted to all observers with the same delay as the audio so that an observer can view all players simultaneously, synchronized to the audio.

Although the diagrams show only three players and three observers, the model is easily understood by one of ordinary skill in the art as applying to configurations with two or more players and two or more observers.

In another embodiment, for example to conserve bandwidth, each Observer Client App can transmit a signal to Game Server 600 to specify which audio signal to receive, and Game Server 600 then transmits only the requested player's audio signal to the particular observer. For example, Observer A may want to listen to Player Y. In that case, Observer Client App for Observer A 604 transmits a control signal to Game Server App 600 indicating to only transmit AudY to Observer Client App for Observer A 604.

Figure 7:
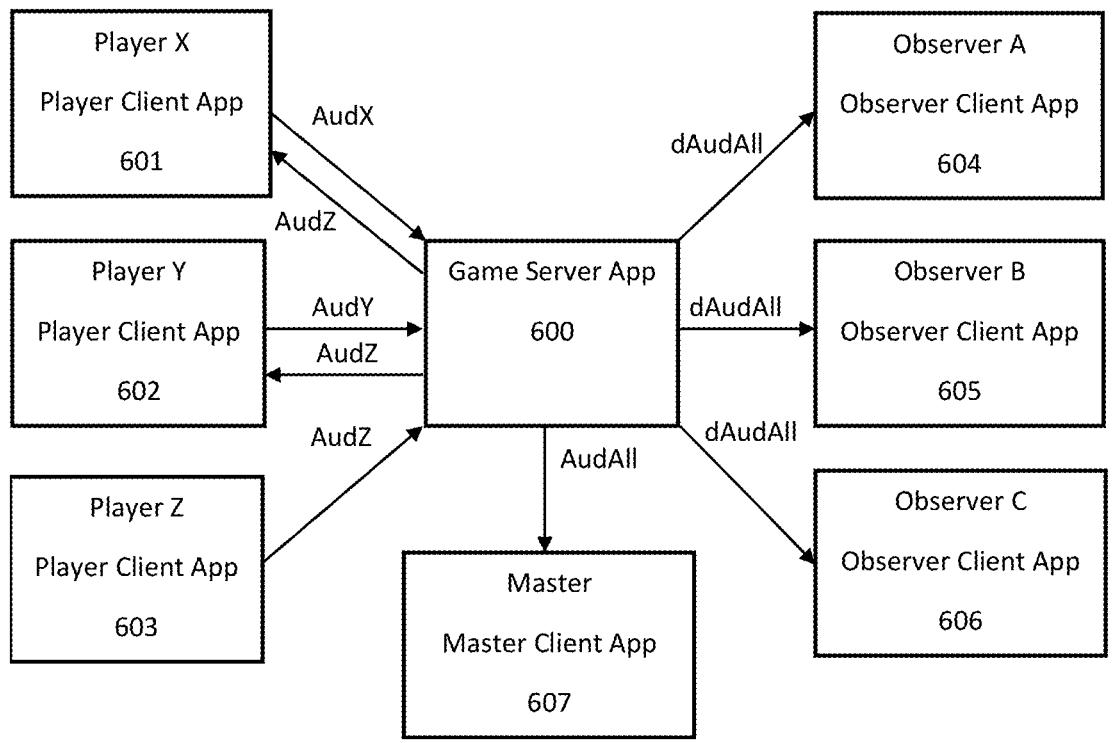
FIG. 7 is a diagram for one embodiment of media communication of the present invention between players, observers, and a master when Player Z selects to communicate with other players.

FIG. 7 is a diagram of audio communication between players, observers, and master in one embodiment when Player Z wishes to communicate with other players. In this example, Player Z has decided to transmit audio to all other players, for example to talk smack and try to intimidate them. Player Z then sets a control to indicate to transmit their audio to all other players. Player Client App for Player Z 603 transmits a control signal to Game Server App 600, which then transmits AudZ to Player Client App for Player X and Player Client App for Player Y, without any delay, and to all observers with the typical delay inserted by Game Server App 600. All player video is transmitted to all observers with delay and to all players without delay so that a player and an observer can view all players simultaneously, synchronized to the audio.

Figure 8:
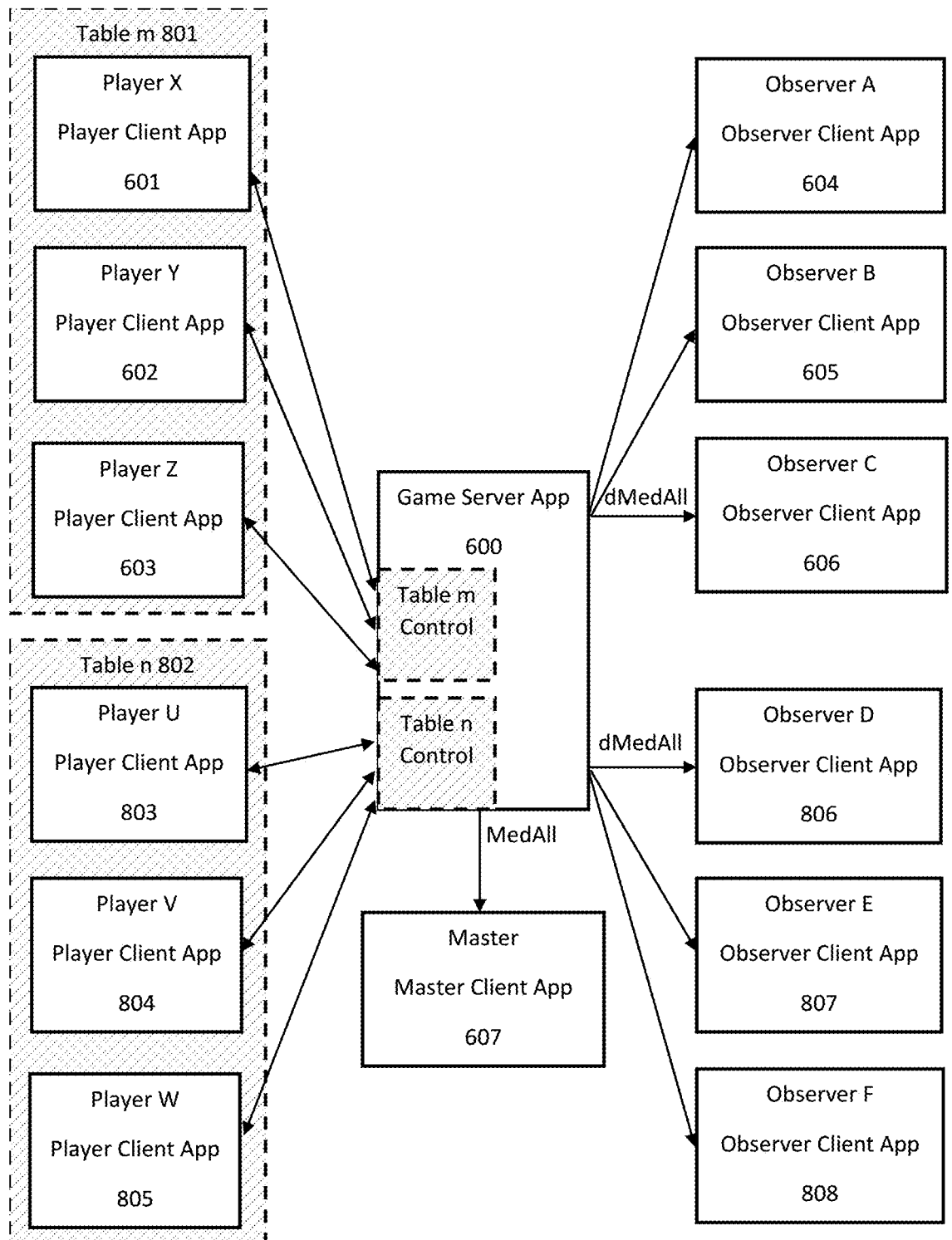
FIG. 8 is a diagram for one embodiment of media communication of the present invention between players, observers, and a master where there are multiple game tables.

FIG. 8 is a diagram of media communication, including audio and video, between players, observers, and master in one embodiment where there are multiple game tables. Players X, Y, and Z are situated at virtual Table m 801 while players U, V, and W are situated at virtual Table n 802, which are not necessarily physical tables but rather a grouping of players as if they were sitting at a physical table. One of ordinary skill in the art would know that each table can be a physical table if adjustments are made to keep players from hearing each other directly. All media communications go through the Game Server App 600. All observers can select to hear commentary from any player at any table. Any player has one of two options with regard to transmitting audio to other players: 1) communicate with no players or 2) communicate with all players at the same table. With both options, player's audio is always transmitted to all observers. Typically, all audio from all tables is transmitted with delay by Game Server App 600 to all observers where each observer indicates to their Observer Client App which player's audio to present. In another embodiment, for example to conserve bandwidth, each Observer Client App can transmit a control signal to Game Server 600 to specify which table's audio to receive, and Game Server 600 then transmits audio from all players at the selected table to the particular observer. As described earlier, in yet another embodiment, each Observer Client App can transmit a control signal to Game Server 600 to specify which player's audio to receive, and Game Server 600 then transmits only the requested player's audio signal to the particular observer. All player video is transmitted to all observers with the same delay as the audio so that an observer can view all players simultaneously, synchronized to the audio.

For large games, more than one master may be required. For example, a single master may be able to switch between observing players at a single table, or there may be one master assigned to each table. One of ordinary skill in the art would understand that various configurations of multiple masters is possible.

All observers see and hear a delayed game. This is done to prevent players from watching a game as an observer and gleaning information about other players' cards and strategies. Also, games can be recorded for viewing long after the game is over.

Figure 9:
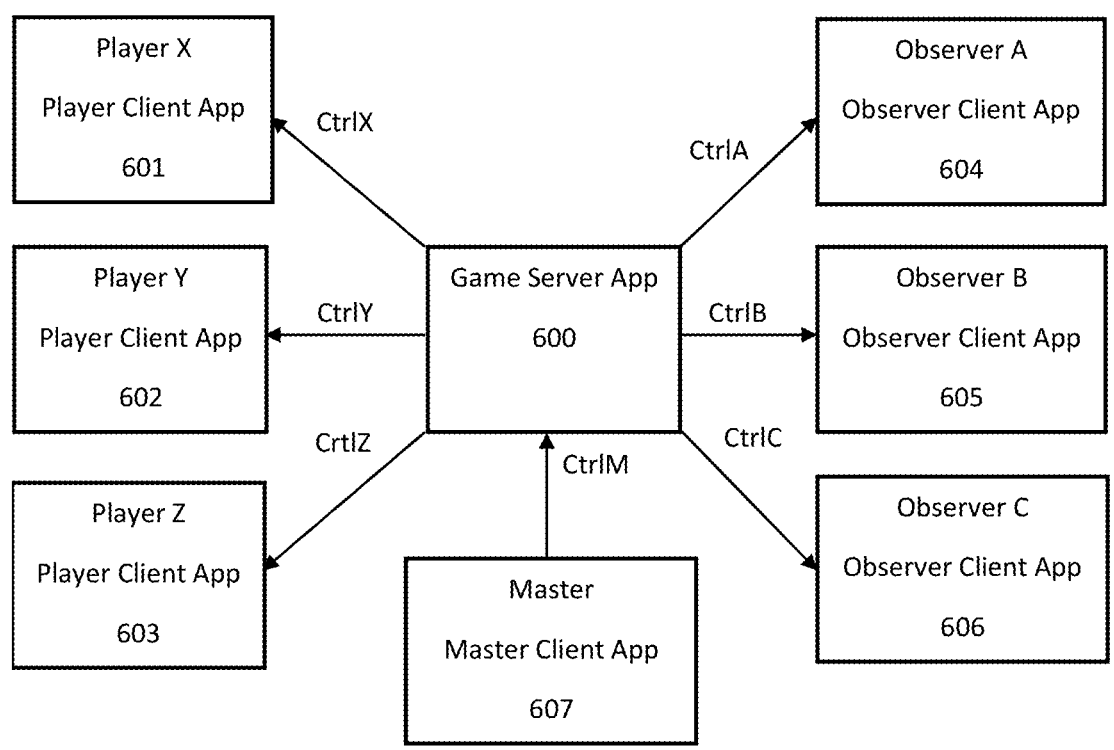
FIG. 9 is a diagram for one embodiment of the control communication of the present invention.

FIG. 9 is a diagram of the control communication of the present invention. The Master Client App 607 allows the master to transmit control information to the Game Server App 600, which in turn controls the communication of media between clients and transmits control information to one or more player client apps and observer client apps. Control information includes but is not limited to informing the client app to block all audio from that client, hide all video from that client, disable the client app, or disconnect the client app from the system. These functions can also be performed within Game Server App 600. Control information also controls all multiplexers and demultiplexers within Game Server App 600 and all client applications to combine, remove, or separate media signals. Multiplexers and demultiplexers are each capable of being implemented in hardware or software or combinations of hardware and software. Control signals sent from Master Client App 607 are labeled CtrlM. Control signals received by player client apps are labeled CtrlX, CtrlY, and CtrlZ. Control signals received by observer client apps are labeled CtrlA, CtrlB, and CtrlC.

Figure 10:
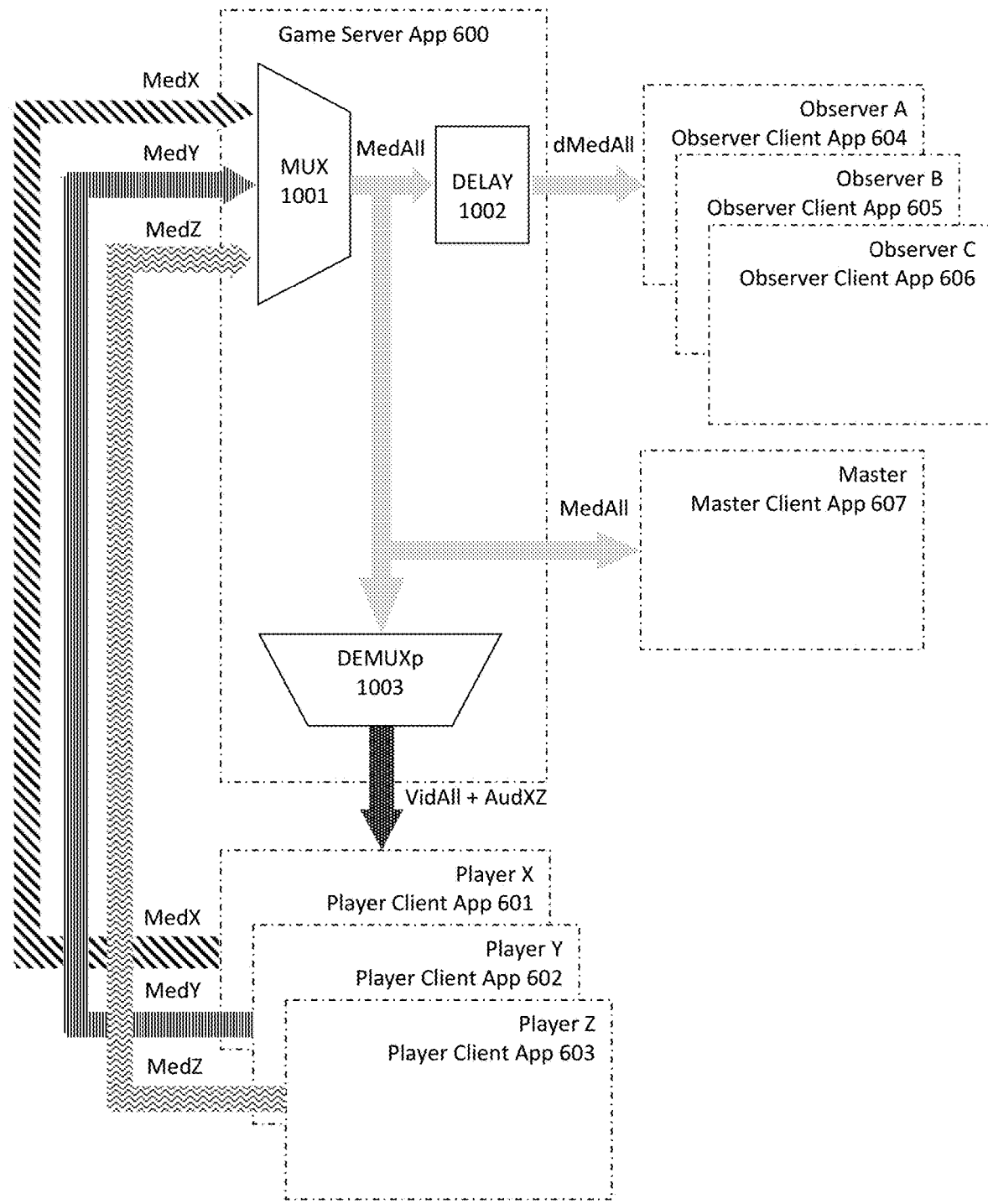
FIG. 10 is a diagram for one embodiment of an implementation of communication logic of the present invention for transferring media between players, observers, and a master.

FIG. 10 is a diagram showing an implementation of communication logic for transferring media between players and observers. Media signals from players X, Y, and Z, labeled MedX, MedY, and MedZ respectively, are input to Game Server App 600 where the signals are routed to multiplexer MUX 1001 and combined into a combined media signal MedAll, which is sent to DELAY 1002, which delays the signal for a preset amount of time before transmitting the delayed combined media signal dMedAll to Observer Client Apps 604, 605, and 606.

In Game Server App 600, combined media signal MedAll is also sent to demultiplexer DEMUXp 1003. In the situation that is illustrated in FIG. 10, both Player X and Player Z have decided to communicate with their fellow players, so DEMUXp 1003 extracts audio signals AudX and AudZ and all video signals VidAll from combined media signal MedAll and transmits the selected player media signal for players X and Z, labeled VidAll+AudXZ, to all players via their Player Client Apps 601, 602, and 603. In this way, all players hear commentary from Player X and Player Y and see video from all players.

In Game Server App 600, combined master media signal MedAll is also sent to Master Client App 607 without any delay. In the illustrated embodiment, the combined media signal and the combined master media signal are both shown as signal MedAll generated from MUX 1001, but in another embodiment, these may be different signals generated by different multiplexers.

Figure 11:
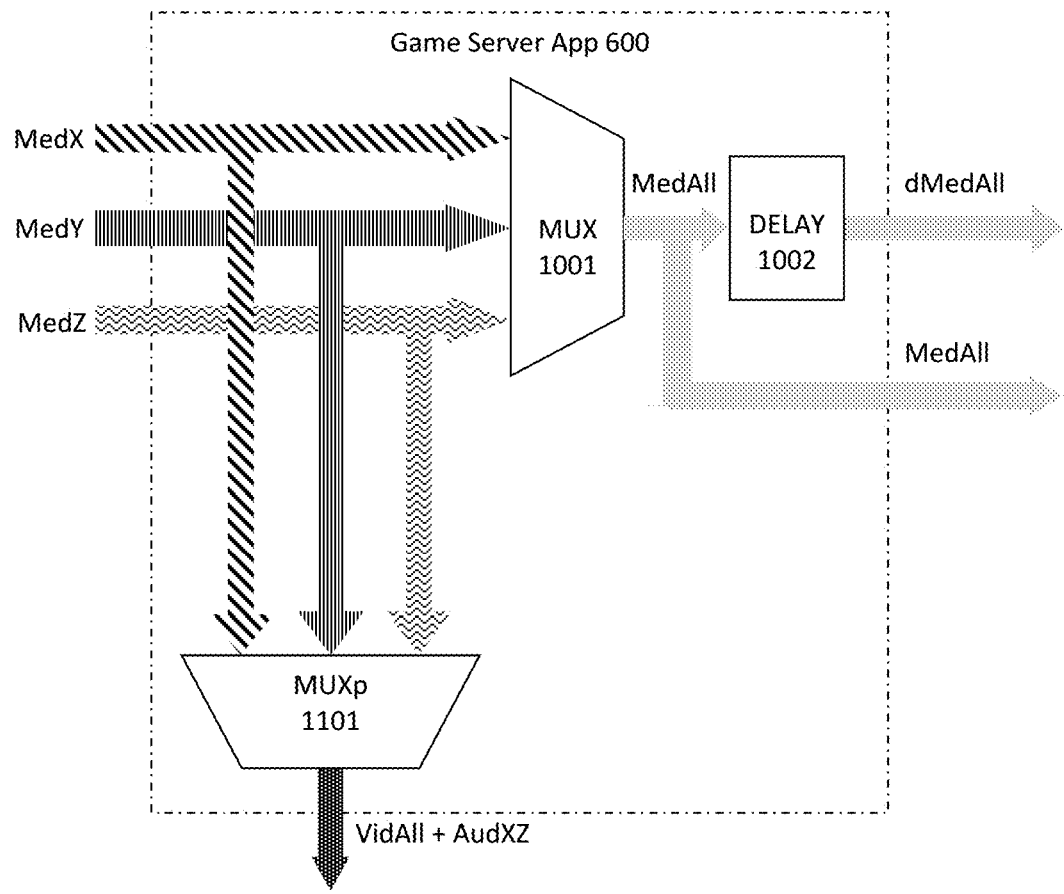
FIG. 11 is a diagram for another embodiment of an implementation of communication logic of the present invention for transferring media between players, observers, and a master.

FIG. 11 is a diagram showing an alternate implementation of communication logic for the game server of the present invention. In this embodiment, media signals from players X, Y, and Z, labeled MedX, MedY, and MedZ respectively, are sent directly to multiplexer MUXp 1101. In the situation that is illustrated in the figure, both players X and Z have decided to communicate with their fellow players, so MUXp 1101 combines media signals AudX and AudZ into selected player media signal AudXZ, which is then transmitted along with video signal VidAll to all players via their Player Client Apps.

Figure 12:
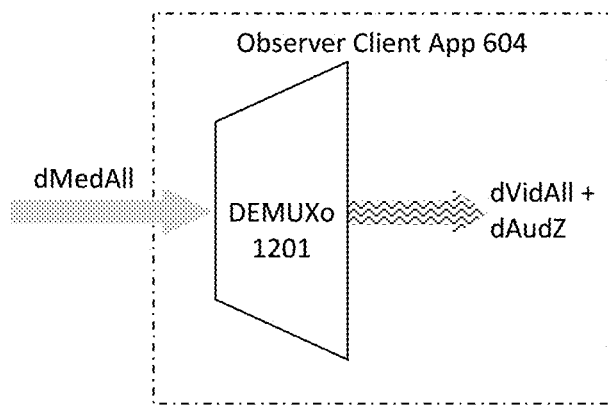
FIG. 12 is a diagram for one embodiment of an implementation of communication logic of the present invention inside an observer client.

FIG. 12 is a diagram of an implementation of communication logic of the present invention inside an observer client. In the example shown, the observer has decided to listen to Player Z and so demultiplexer DEMUXo 1201 is configured to extract audio signal dAudZ and video signal dVidAll from delayed combined media signal dMedAll to transmit dVidAll to the observer's display and delayed audio signal dAudZ to the observer's speakers.

Figure 13:
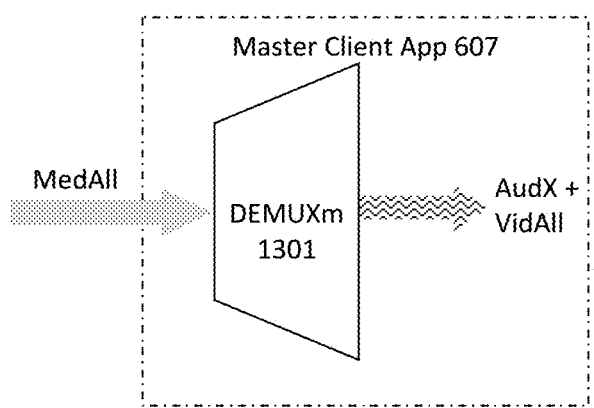
FIG. 13 is a diagram for one embodiment of an implementation of communication logic of the present invention inside a master client.

FIG. 13 is a diagram of an implementation of communication logic of the present invention inside a master client. Combined master media signal MedAll is sent to demultiplexer DEMUXm 1301 in Master Client App 607 without any delay. DEMUXm 1301 extracts all video signals and come or all audio signals from combined master media signal MedAll. In the example shown, the master has selected to listen to audio from Player X while viewing all players.

Each player only gets the audio to which they are entitled so that a player cannot hack into other audio signals, for example commentary by other players at the table. Because they get only the audio signals to which they are entitled, there is no need for an audio demultiplexer in the Player Client Apps.

Figure 14:
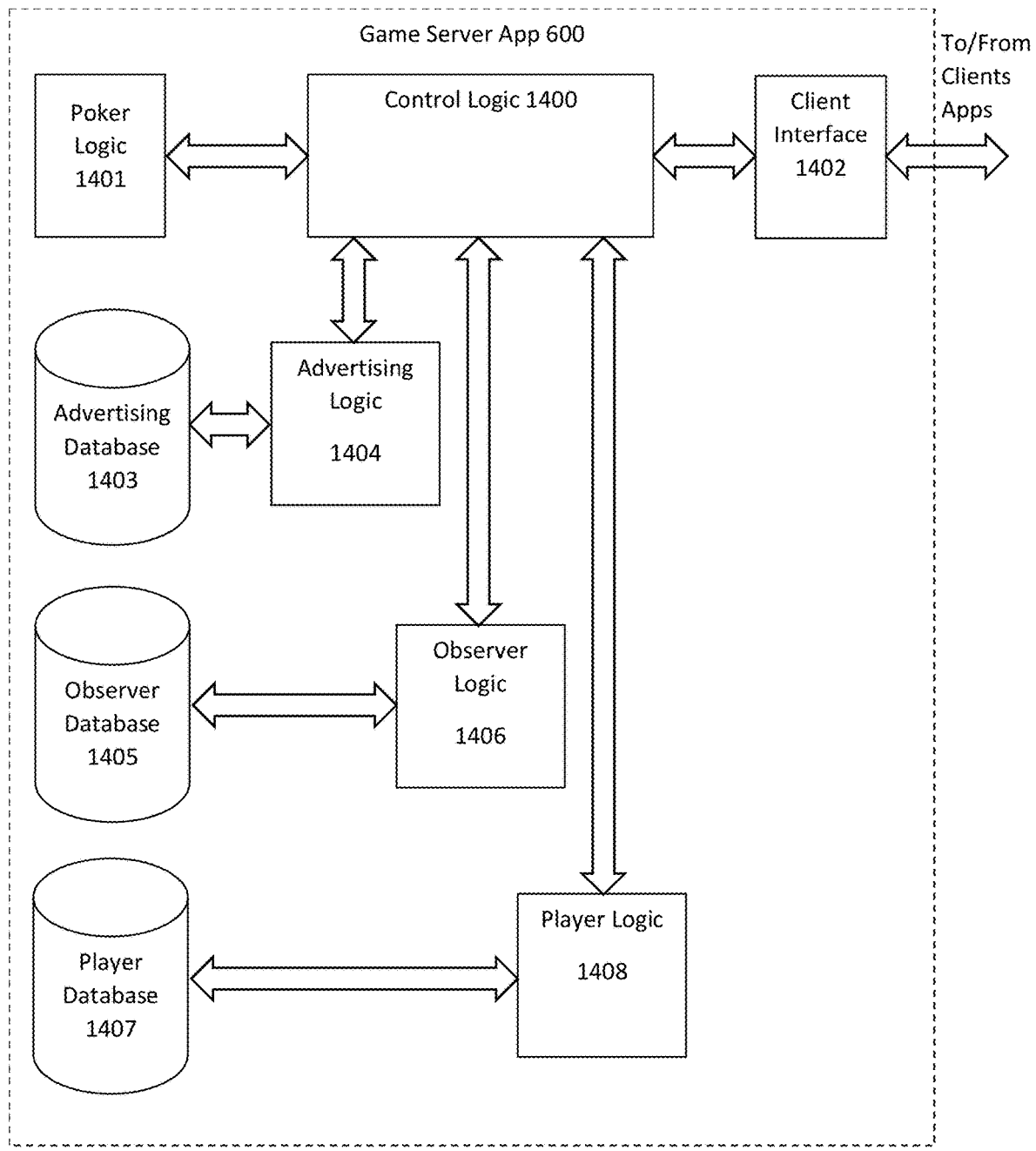
FIG. 14 is a diagram for one embodiment of the internal architecture of the game server application.

FIG. 14 is a diagram of the internal architecture of Game Server App 600. Control Logic 1400 contains the main control logic. Poker Logic 1401 implements all of the poker game play including dealing cards, running games, handling betting, timing play, and keeping track of chips. Client Interface 1402 communicates with all of the player, observer, and master client apps via a network. Advertising Database 1403 keeps track of ads from sponsors. Advertising Logic 1404 controls which clients see which advertisements and at which times during game play. Observer Database 1405 keeps track of information about all observers that have used the system. Observer Logic 1406 controls information entered into the Observer Database 1405 and extracted from it. Player Database 1407 keeps track of information about all players that have used the system. Player Logic 1408 controls information entered into the Player Database 1407 and extracted from it.

Advertisements from sponsors of the games can be transmitted to observers that are then displayed on each Observer Display 400. A single advertisement can be transmitted to all observers or to groups of observers or to individual observers based on their preferences. Such preferences can be determined by many different means including, but not limited to, a survey taken by the observer when signing up for the system, the observer's interactions with the system during game play, interaction of the observer with previous advertisements, and other activities that are recorded on the observer's computer, during and outside of game play, such as videos watched, products purchased, and items searched for. Advertisements can be transmitted at predetermined times under the control of the Game Server App 600, for example during breaks in the game play, or transmitted under the control of the master using the Master Client App 607, which transmits control signals to Game Server App 600, commanding it to transmit advertisements.

The master can transmit messages to individual observers, individual players, groups or observers, groups of players, other masters, or combinations using the Master Client App 607 to transmit control signals to the Game Server, commanding it to transmit messages. This feature can be used to transmit emergency messages, reminders about game rules, information about the ongoing game, educational information about how to play the game, or other messages.

Observers, players, and masters can use their client app to query the Player Database 1407 via control signals sent to Game Server App 600 to retrieve information about players that will be displayed on their app display. This allows observers, players, and master to see statistics about players' standing in the current game, lifetime winnings, total tournament entries, rankings in online poker, rankings worldwide, and other information about players.

In jurisdictions where gambling is allowed, observers can bet on players throughout the game. Observers place bets using the Observer Controls 404, which then transmits betting information to Game Server App 600. Odds are calculated in real time, taking into account information in the Player Database 1407, including such things as the current success of the player in the game (for example as measured by the relative number of chips in their stack), how many players are left in the game, the skill levels of other players currently in the game, and the player's overall ranking based on the player's lifetime game play history.

All communication within the system uses strong encryption methods to ensure that audio and visual signals cannot be intercepted by players to influence their game play or by observers to influence betting.

One of ordinary skill in the art would know that the present invention can be implemented in hardware, software, or combinations thereof.

In the preceding description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

I claim:

1. A computer-implemented method for a game server to provide real-time commenting on remote game play, the method comprising:
   receiving audio or video media from multiple players via a network;
   combining said received audio or video media into a combined audio or video media signal via a multiplexer;
   transmitting said combined audio or video media signal after a predetermined delay to observers on said network;
   creating a selected player audio or video-media signal by removing audio or video media of one or more of said multiple players from said combined audio or video media signal via a demultiplexer; and
   transmitting said selected player audio or video media signal to one or more of said multiple players via said network thereby enabling communication between said multiple players.

2. The method of claim 1 where said transmitting said combined audio or video media signal includes removing audio or video media from one or more of said multiple players, via a second demultiplexer.

3. The method of claim 1 including combining said received audio or video media into a combined master audio or video media signal via said multiplexer; and transmitting said combined master audio or video media signal to masters on said network.

4. The method of claim 3 where said transmitting said combined master audio or video media signal includes removing audio or video media from one or more of said multiple players, via a second demultiplexer.

5. A computer-implemented method for a game server to provide real-time commenting on remote game play, the method comprising:
   receiving audio or video media from multiple players via a network;
   combining said received audio or video media into a combined audio or video media signal via a first multiplexer;
   transmitting said combined audio or video media signal after a predetermined delay to observers on said network;
   combining said received audio or video media from one or more of said multiple players into a selected player audio or video media signal via a second multiplexer; and
   transmitting said selected player audio or video media signal to one or more of said multiple players via said network thereby enabling communication between said multiple players.

6. The method of claim 5 where said transmitting said combined audio or video media signal includes removing audio or video media from one or more of said multiple players, via a demultiplexer.

7. The method of claim 5 including combining said received audio or video media into a combined master audio or video media signal via said first multiplexer; and transmitting said combined master audio or video media signal to masters on said network.

8. The method of claim 7 where said transmitting said combined master audio or video media signal includes removing audio or video media from one or more of said multiple players, via a demultiplexer.

9. A computer-implemented method for a game server to provide real-time commenting on remote game play, the method comprising:
   blocking images of mouths of one or more players in video media from multiple players before transmitting video media from each player over a network;
   receiving said video media from each player via said network;
   combining said received video media into a combined video media signal via a multiplexer;
   transmitting said combined video media signal after a predetermined delay to observers on said network;
   creating a selected player video media signal by removing video media of one or more of said multiple players from said combined video media signal via a demultiplexer; and
   transmitting said selected player video media signal to one or more of said multiple players via said network thereby enabling communication between said multiple players.

10. The method of claim 9 where said transmitting said combined video media signal includes removing video media from one or more of said multiple players, via a second demultiplexer.

11. The method of claim 9 including combining said received video media into a combined master video media signal via said multiplexer; and transmitting said combined master video media signal to masters on said network.

12. The method of claim 11 where said transmitting said combined master video media signal includes removing video media from one or more of said multiple players, via a second demultiplexer.

13. The method of claim 9 where blocking images of mouths of players includes detecting an image of a player's mouth.

14. A computer-implemented method for a game server to provide real-time commenting on remote game play, the method comprising:
   receiving video media from each of multiple players via a network;
   combining said received video media into a combined video media signal via a first multiplexer;
   transmitting said combined video media signal after a predetermined delay to observers on said network;
   combining said received video media from one or more of said multiple players into a selected player video media signal via a second multiplexer;
   blocking images of mouths of one or more players in video portions of said selected player video media signal; and
   transmitting said selected player video media signal in which images of mouths of one or more players in video portions of said selected player video media signal have been blocked to one or more of said multiple players via said network thereby enabling communication between said multiple players.

15. The method of claim 14 including combining said received video media into a combined master video media signal via said first multiplexer; and transmitting said combined master video media signal to masters on said network.

16. The method of claim 14 where said transmitting said combined video media signal includes removing video media from one or more of said multiple players, via a demultiplexer.

17. The method of claim 14 where blocking images of mouths of players includes detecting an image of a player's mouth.

* * * * *